G. R. Marvin,
Ice Cutter.
No. 74236.  Patented Feb. 11. 1868.
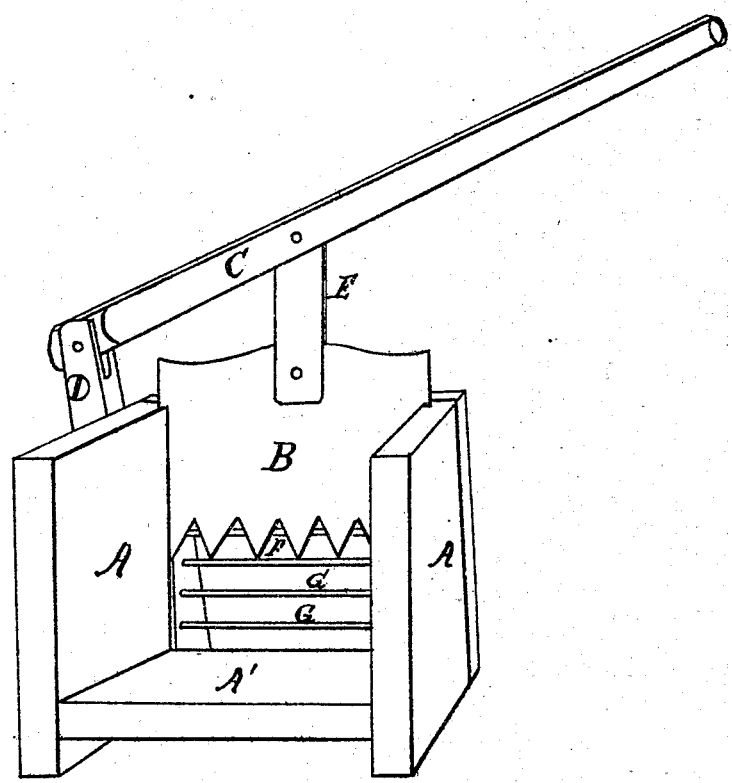
Witnesses.
Samuel Jacob Wallace
R. S. Chapman
Inventor.
George R. Marvin

United States Patent Office.

GEORGE R. MARVIN, OF KEOKUK, IOWA.

Letters Patent No. 74,236, dated February 11, 1868; antedated January 30, 1868.

IMPROVED ICE-CUTTER.

The Schedule referred to in these Letters Patent and making part of the same.

TO ALL WHOM IT MAY CONCERN:

Be it known that I, GEORGE R. MARVIN, of the city of Keokuk, county of Lee, and State of Iowa, have invented a new and useful Improvement in Ice-Cutters; and I do hereby declare the following to be a full, clear, and exact description thereof, reference being had to the accompanying drawings, and to the letters of reference marked thereon, in which—

Figure 1 is a perspective view or elevation of my improved ice-cutter, as ready for use.

The object of this invention is to provide a ready and good means of reducing block-ice to a small granular or chipped state, suitable for use in freezing and cooling-processes, and it consists of the cutter or apparatus, which is made as shown in the drawings, and as hereinafter set forth.

A A A' is a suitable box, the bottom, A', of which is inclined one way, to facilitate the holding and advance of the block-ice, and its splinters and drippings, toward the cutter B. From the side of one end of this box there rises a part, D, to which is pivoted the hand-lever C, which extends up and across the end of the box. From this lever C, a connecting-part, E, descends, and holds a cutter, B, which reaches across the end of the box, and slides up and down as the lever C is raised or lowered by the hand of the operator, moving in or guided by grooves or guides, cut in or fixed at the sides A A, for its ends. On the lower side of the cutter B are cut saw-shaped pointed teeth, F, which are bevelled, and set in or back toward the ice to be cut, so that the effect of the descending cutter will be to cut into the block, and splinter off, by the pointed teeth F, small pieces of various sizes and shapes, suitable for the intended purpose, while the ice is held against the bars G G, which are extended across the box, at a suitable distance in front of the cutter B, and through the spaces between which the separated pieces are pressed. The several parts can be more or less varied, as may be desired.

What I claim is—

The improved ice-cutter, formed of a box, A A A', and the cutter B, with teeth F, and a hand-lever, C, in combination with the toothed ice-cutter B and stop-bars G G, substantially as and for the purpose set forth.

GEO. R. MARVIN.

Witnesses:
SAMUEL JACOB WALLACE,
J. H. SULLIVAN.